(12) United States Patent
Chee et al.

(10) Patent No.: US 6,526,397 B2
(45) Date of Patent: *Feb. 25, 2003

(54) RESOURCE MANAGEMENT FACILITATION

(75) Inventors: Chuan Khay Chee, Toronto (CA); Jeannie Lin Chopra, Fremont, CA (US); Adrian Richard Davies, London (GB)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/100,011

(22) Filed: Jun. 19, 1998

(65) Prior Publication Data

US 2001/0029503 A1 Oct. 11, 2001

(51) Int. Cl.7 .......................... G06F 17/30; G06F 13/00; H04M 3/00
(52) U.S. Cl. ...................... 707/1; 345/790; 379/266.01
(58) Field of Search ............................ 707/1, 100, 104, 707/104.1; 705/2, 7; 379/221, 242, 265, 266, 267, 309, 219, 266.01; 345/333, 334, 335, 339, 340, 344, 790, 794, 796

(56) References Cited

U.S. PATENT DOCUMENTS

| | | | | |
|---|---|---|---|---|
| 4,827,410 A | * | 5/1989 | Corren | 345/840 |
| 5,185,780 A | * | 2/1993 | Leggett | 379/34 |
| 5,479,497 A | * | 12/1995 | Kovarik | 379/265 |
| 5,590,188 A | * | 12/1996 | Crockett | 379/225 |
| 5,633,924 A | * | 5/1997 | Kaish et al. | 379/266 |
| 5,696,697 A | * | 12/1997 | Blau et al | 364/514 C |
| 5,721,770 A | * | 2/1998 | Kohler | 379/266 |
| 5,784,452 A | * | 7/1998 | Carney | 379/265 |
| 5,790,650 A | * | 8/1998 | Dunn et al. | 379/265 |
| 5,825,360 A | * | 10/1998 | Odam et al. | 345/344 |
| 5,911,134 A | * | 6/1999 | Castonguay et al. | 705/9 |
| 5,995,614 A | * | 11/1999 | Miloslavsky | 379/265 |
| 5,995,615 A | * | 11/1999 | Miloslavsky | 379/265 |
| 5,995,937 A | * | 11/1999 | DeBusk et al. | 705/2 |
| 5,999,609 A | * | 12/1999 | Nishimura | 379/201 |
| 5,999,965 A | * | 12/1999 | Kelly | 709/202 |
| 6,005,575 A | * | 12/1999 | Colleran et al. | 345/344 |
| 6,032,122 A | * | 2/2000 | Gertner et al. | 705/8 |
| 6,046,762 A | * | 4/2000 | Sonesh et al. | 348/16 |
| 6,047,060 A | * | 4/2000 | Fedorov et al. | 379/265 |
| 6,049,775 A | * | 4/2000 | Gertner et al. | 705/8 |
| 6,239,798 B1 | * | 5/2001 | Ludolph et al. | 345/340 |
| 6,453,038 B1 | * | 9/2002 | McFarlane et al. | 379/265.05 |

OTHER PUBLICATIONS

Lucent Technologies Inc., CentreVu Supervisor Real–Time and Historical Sample Reports, pp. 1–13, dating from Apr., 1998 or earlier.

Lucent Technologies Inc., AT&T CentreVu Supervisor Sales Guide, Mar. 1996; pp. 1–59.

Declaration by Adrian Richard Davies concerning SOFT-CALL product of Cocam UK LTd. dating from 1996 or earlier.

\* cited by examiner

*Primary Examiner*—Safet Metjahic
*Assistant Examiner*—Uyen Le

(57) ABSTRACT

A method and system for resource management. In particular, a resource management system adapted to manage the resources, both machine and human, in call centers. The system calculates and displays statistics continuously which relate to both resources, machine and human, and objects, such as incoming calls, requiring resources. The statistics displayed are user configurable. Moreover, the system detects and warns a user upon a statistic exceeding a user defined threshold. The resource management system allows users to associate a resource to an object requiring resources. In so associating, the resources of the call center are reconfigured. Moreover, the statistics displayed and the method of display by the system are user configurable.

9 Claims, 13 Drawing Sheets

RESOURCE MANAGEMENT FACILITATION

BACKGROUND OF THE INVENTION

This invention relates to a method and system for the management of resources.

Call cents may be established by businesses for the mass handling of incoming and/or outgoing calls. To this end, businesses often publish one or more common telephone numbers for all customer service or sales calls and these calls are received by call centers. The call center will distribute calls to agents so that they are timely answered by an agent who has the skills necessary to handle the call. To facilitate this, the call center may engage a caller in a menu driven session to decide on a queue to place the call to await an agent. (For example, there may be a queue for all english speaking callers who wish information about product X). Statistics, such as the number of calls waiting for an agent with French language skills, are typically displayed on one or more monitors for review by call center supervisors. These statistics allow a supervisor to identify problems which develop in the efficient handling of calls and to make compensating adjustments in the running of the call center. Additionally, it is known to display statistics common to the call center as a whole on a wallboard, which is a scrolling pixelboard.

Each supervisor's monitor may be part of a personal computer (PC) which, under software control, receives a flow of statistical data from a call center. One PC software product to achieve this purpose is the CENTRE VU SUPERVISOR™ by Lucent. With the Lucent product, a supervisor may choose a statistical display which may comprise a text chart and/or one or more graphical charts, such as pie charts or bar charts. For example, the display may include a text chart listing agents along with their state (e.g., handling an automatic call distribution—ACD—call, available, busy with an outgoing call) and a companion pie chart with this data. The data displayed is periodically updated based on the incoming flow of statistical data.

SUMMARY OF THE INVENTION

In accordance with the present invention, there is provided a method of facilitating management of resources, comprising the steps of: displaying a plurality of resource objects, each resource object representing a resource; displaying a plurality of resource requiring objects, eat resource requiring object representing a resource requiring process; receiving a user input associating a selected resource object with a selected resource requiring object; allocating a resource represented by said selected resource object to a resource requiring process represented by sail selected resource requiring object.

According to another aspect of the invention, there is provided a method of facilitating management of a call center, comprising the steps of: displaying a plurality of resource objects, each resource object representing a resource; displaying a plurality of resource requiring objects, each resource requiring object representing a resource requiring process; receiving a user input associating a selected resource object with a selected resource requiring object; allocating a resource represented by said selected resource object to a resource requiring process represented by said selected resource requiring object.

According to a further aspect of the invention, there is provided a method of facilitating management of resources, comprising: constructing a set of first data items from a set of statistics of a first type, each statistic derived from information from an instance of a set of relators; constructing a summary data item from said set of first data items; receiving a user input associating said summary data item with a set of at least one second data item, each said second data item representing a statistic of a second type derived from an instance of said set of relators; responsive to said step of receiving, associating said set of first data items with said set of second data items; displaying said set of first data items; responsive to a user input indicating one of said first data items, displaying a second data item derived from an instance of said set of relators from which said indicated first data item was derived.

According to a further aspect of the invention, there is provided a method of facilitating management of resources, comprising: constructing a set of first data items from a set of statistics of a first type, each statistic derived from information from an instance of a set of relators; receiving a user input associating one of said first data items with a set of at least one second data item, each said second data item representing a statistic of a second type derived from an instance of said set of relators from which said one first data item was derived; responsive to said step of receiving, associating said set of first data items with said set of second data items; displaying said set of first data items; responsive to a user input indicating one of said first data items, displaying a second data item derived from an instance of said set of relators from which said indicated fist data item was derived.

According to a yet further aspect of the invention, there is provided a computer media product comprising: means for displaying a plurality of resource objects, each resource object representing a resource; means for displaying a plurality of resource requiring objects, each resource red object representing a resource requiring process; means for receiving a user input associating a selected resource object with a selected resource requiring object; means for allocating a resource represented by said selected resource object to a resource requiring process represented by said selected resource rewiring object.

According to a yet further aspect of the invention, there is provided a computer media product comprising: means for constructing a set of first data items from a set of statistics of a first type, each statistic derived from information from an instance of a set of relators; means for receiving a user input associating one of said first data items with a set of at least one second data item, each said second data item representing a statistic of a second type derived from an instance of said set of relators from which said one first data item was derived; means for, responsive to said step of receiving, associating said set of first data items with said set of second data items; means for displaying said set of first data items; means for, responsive to a user input indicating one of said first data items, displaying a second data item derived from an instance of said set of relators from which said indicated first data item was derived.

According to a yet further aspect of the invention, there is provided a system for management facilitation comprising: means for displaying a plurality of resource objects, each resource object representing a resource; means for displaying a plurality of resource requiring objects, each resource requiring object representing a resource requiring process; means for receiving a user input associating a selected resource object with a selected resource requiring object; mean for allocating a resource represented by said selected resource object to a resource requiring process represented by said selected resource requiring object.

According to a yet further aspect of the invention, there is provided a system for management facilitation comprising: means for constricting a set of first data items from a set of statistics of a first type, each statistic derived from information from an instance of a set of relators; means for receiving a user input associating one of said first data items with a set of at least one second data item, each said second data item representing a statistic of a second type derived from an instance of said set of relators from which said one first data item was derived; means for, responsive to said step of receiving, associating said set of first data items with said set of second data items; means for displaying said set of first data items; means for, responsive to a user input indicating one of said first data items, displaying a second data item derived from an instance of said set of relators from which said indicated first data item was derived.

BRIEF DESCRIPTION OF THE DRAWINGS

In the drawings which illustrate example embodiments of this invention.

DETAILED DESCRIPTION OF THE PREFERRED EMBODIMENTS

Figure 1:
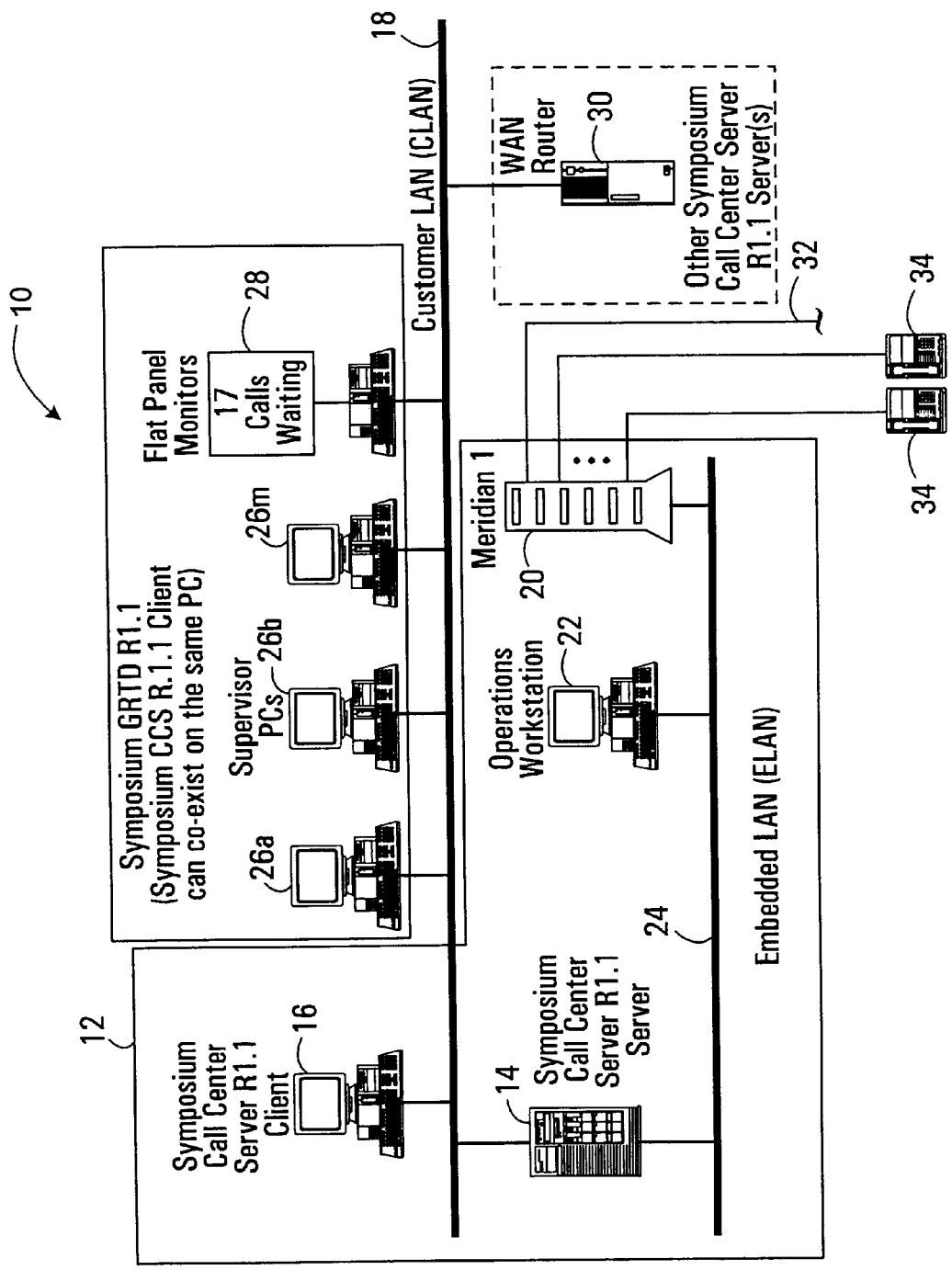
FIG. 1 is a schematic diagram of a call center system constructed in accordance with this invention.

Turning to FIG. 1, a call center system 10 comprises a call center 12 with a server 14 and server client 16 connected to a local area network (LAN) 18. The center 12 also comprises a telephone switch 20 and an operations workstation 22 which, together with the server 14, are connected to an embedded LAN (ELAN) 24. A number of supervisor PCs 26a, 26b, a manager's PC 26m, and a flat panel monitor 28 are also connected to LAN 18. LAN 18 may also connect to a wide area network (WAN) router 30 which is part of a WAN that connects to other call centers. The telephone switch is connected to one or more telephone trunks 32 and to a number of local telephones 34.

Figure 2:
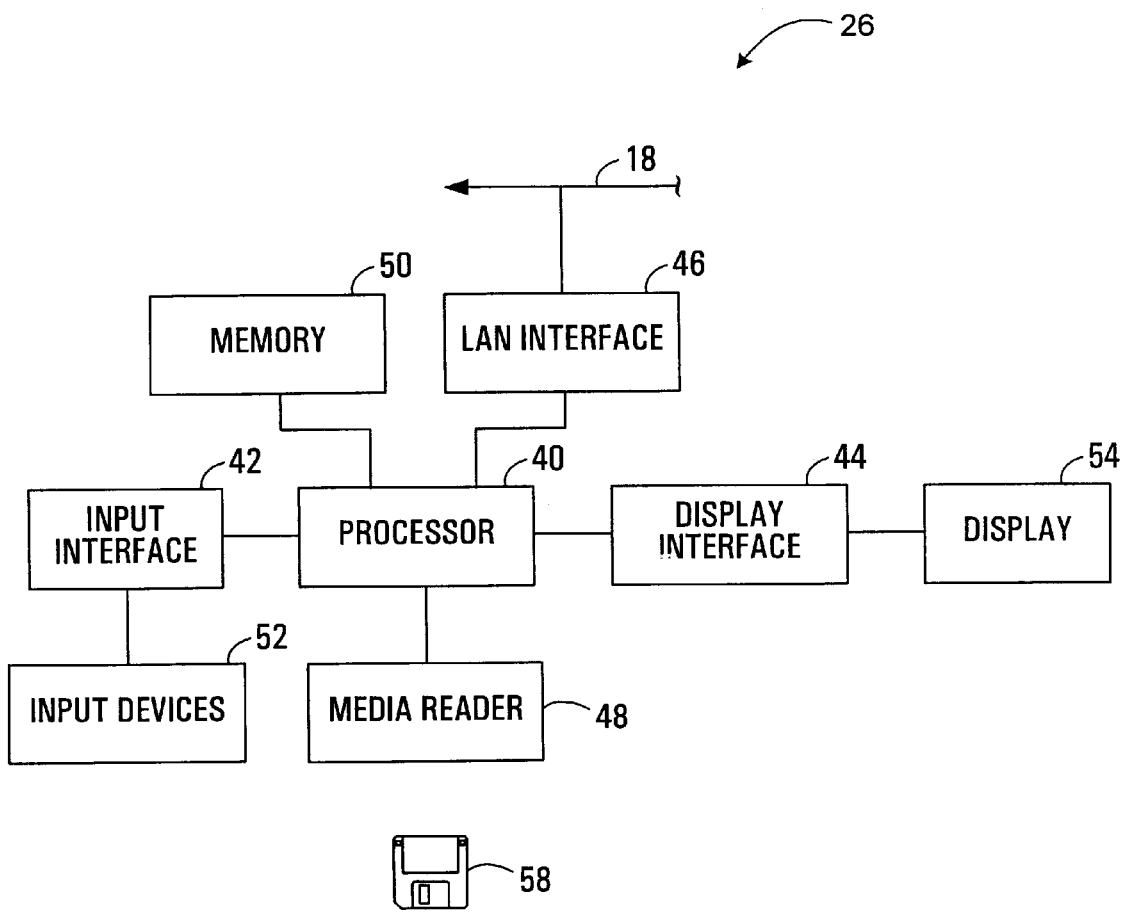
FIG. 2 is a functional block diagram of a PC of a call center of FIG. 1, FIGS. 3a to 3d are flow diagrams of the software control for the PC of FIG. 2.

Turning to FIG. 2, a PC 26 comprises a processor 40 operationally connected to an input interface 42, a display interface 44, a LAN interface 46, a media reader 48 and memory 50. The input interface is connected to user input devices 52 (such as a keyboard and mouse), the display interface 44 is connected to a display 54, and the LAN interface 46 is connected to LAN 18. The media reader 48 may read computer media product 58.

In operational overview, the telephone switch receives telephone calls from trunk 32 and distributes these to telephones 34 under control of server 14, which is preferably a SYMPOSIUM CALL CENTER SERVER™ manufactured by North Telecom Limited. The telephone switch also places outgoing calls from local telephones 34. Server 14 broadcasts statistics and other information regarding calls on LAN 18. As will be described more fully hereinafter, the PCs receive these statistics and display same as data items on their display 54 under software control of their processor 40 and may issue call center reconfiguration commands to the server 14 over LAN 18.

Assuming the server is a SYMPOSIUM CALL CENTER SERVER™, the queues for calls are implemented as "skillsets", each skillset being a collection of skills (e.g. English, Product X). The Server routes calls to appropriate skillsets based on "applications", which are a collection of skillsets (e.g., all English language requiring calls).

The updates ported to the LAN 18 by server 14 are sent at the end of each of consecutive preset time intervals. These updates include (i) number of calls waiting in each skillset (queue) of each application; (ii) number of calls received for each skillset of each application during the interval; (iii) number of calls answered from each skillset of each application during the interval; (iii) an identification of each agent and their status—e.g., on a skillset call; (iv) number of calls abandoned during the interval; (v) the longest wait time on each skillset for each application; and (vi) average answer delay on each skillset for each application. The last two statistics are tracked by the server 14.

Figure 3A:
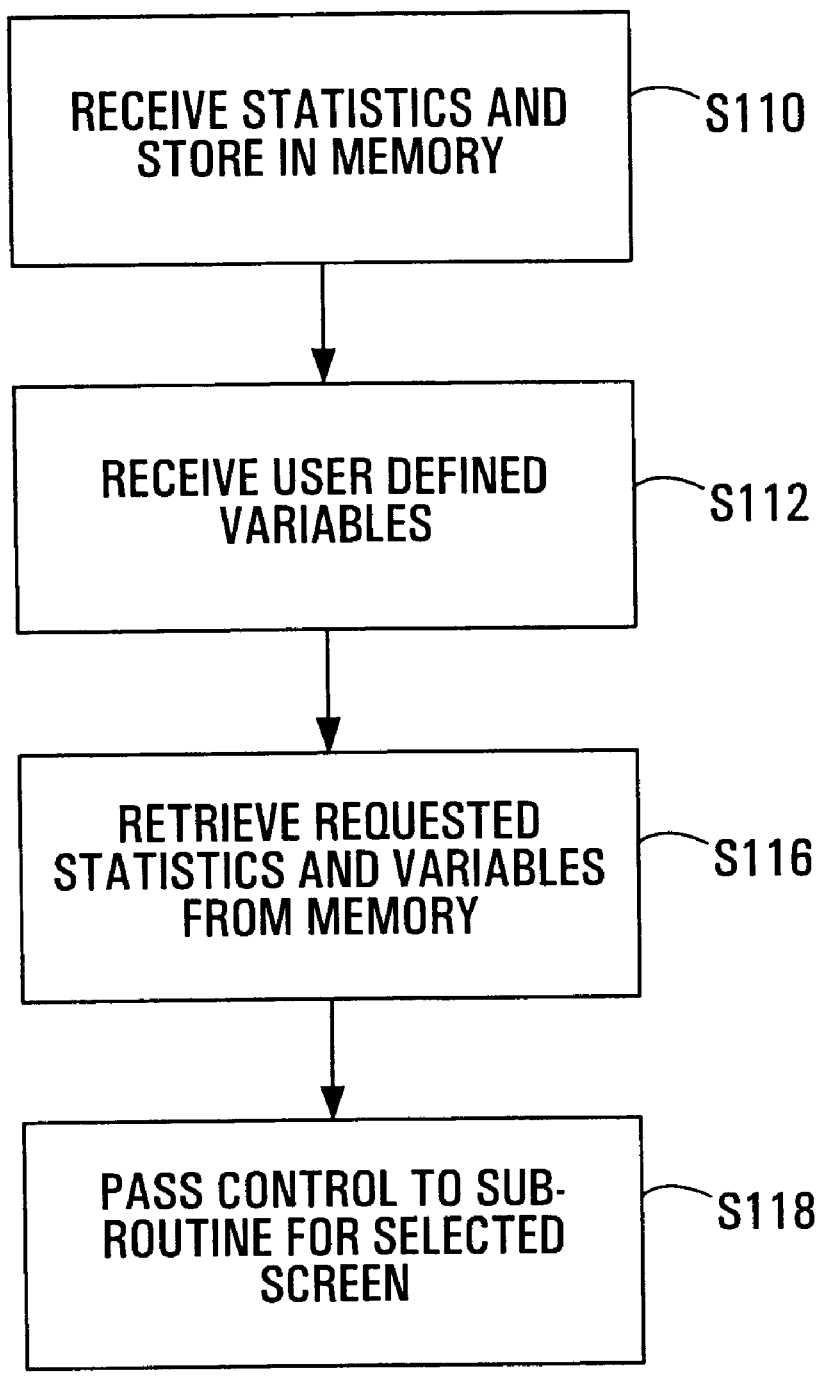

Referencing FIG. 3a, which illustrates the umbrella program control for processor 40 of a PC 26, along with FIG. 2, the processor 40 receives statistics for each time interval via LAN interface 46 and stores these in memory 50 (S110). The processor may receive a user defined time period (which may be the same as, or some multiple of, the time interval for which statistics are received), a user defined time window, and user defined thresholds for statistics, all for reasons which will become apparent hereinafter (S112). On request from any of the sub-routines under the umbrella program, requested statistics are retrieved from memory and passed to the requesting sub-routine along with any associated thresholds and the time period and time window, if also request (S116). Based on a user selection of a screen, display control passes to the sub-routine for the selected screen (S118).

Figure 3B:
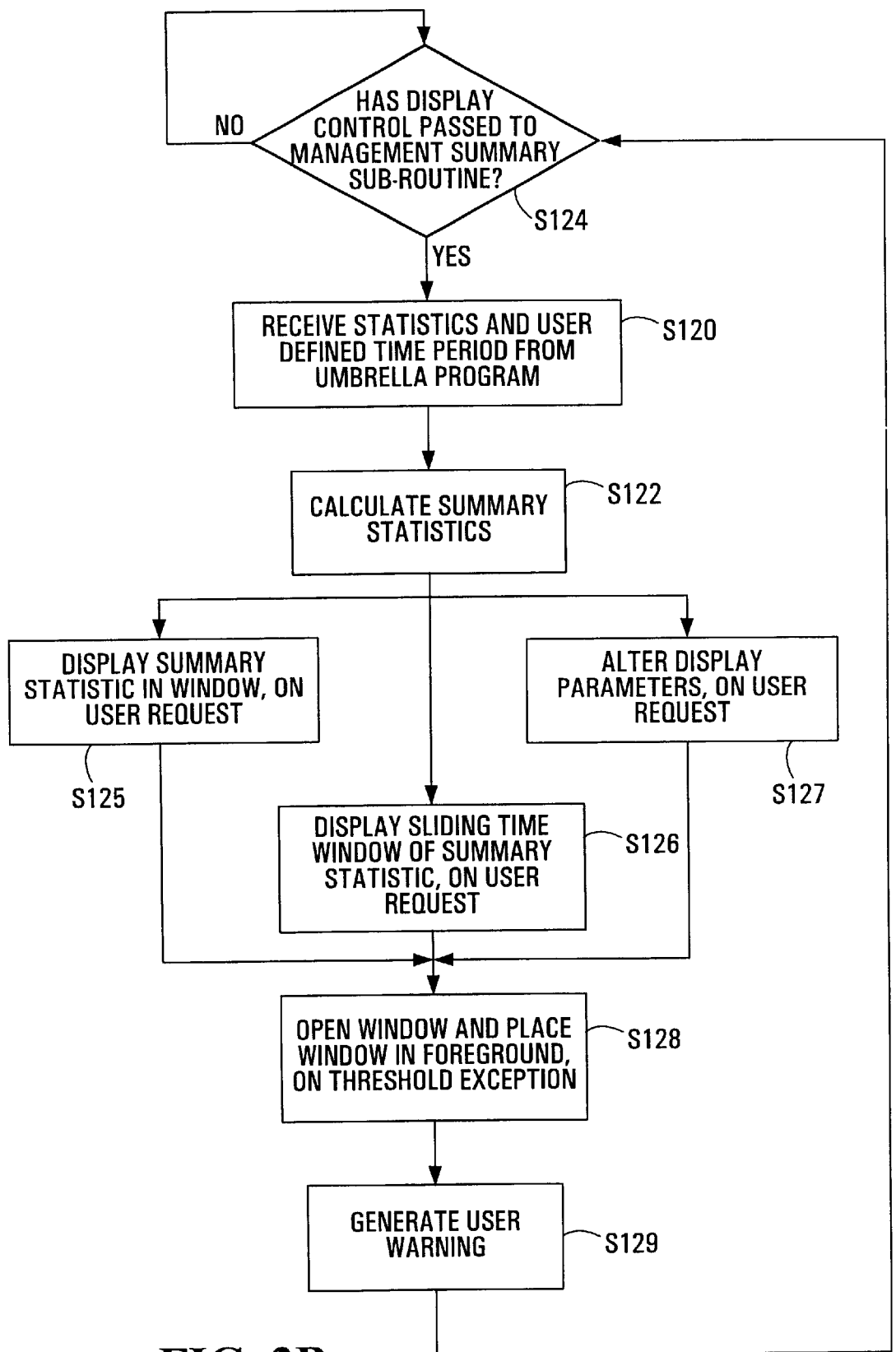

Turning to FIG. 3b which illustrates the program control for the management summary sub-routine, this routine obtains statistics and the user defined time period via the umbrella program (S120) and calculates certain summary statistics (S122). More particularly, the processor calculates instantaneous statistics including the following: (i) the total number of calls currently waiting; (ii) the number of agents on a call for a skillset; and (iii) the total number of agents on outgoing calls. As well, using the user defined time period, the processor calculates cumulative statistics including the following. (i) the number of calls answered during the period; (ii) the number of calls abandoned during the time period; (iii) the percentage of total calls waiting which were answered in the time period; and (iv) the total number of calls received in a period. If a user has requested the management summary screen such that display control has passed to the management summary sub-routine (S124), a user may ask to view any of the calculated summary statistics which results in a window being displayed on display 54 with a data item comprising the requested summary statistic (S125). The data item is displayed as a graphical number in the window, which is described herein as a "billboard window".

Figure 4:
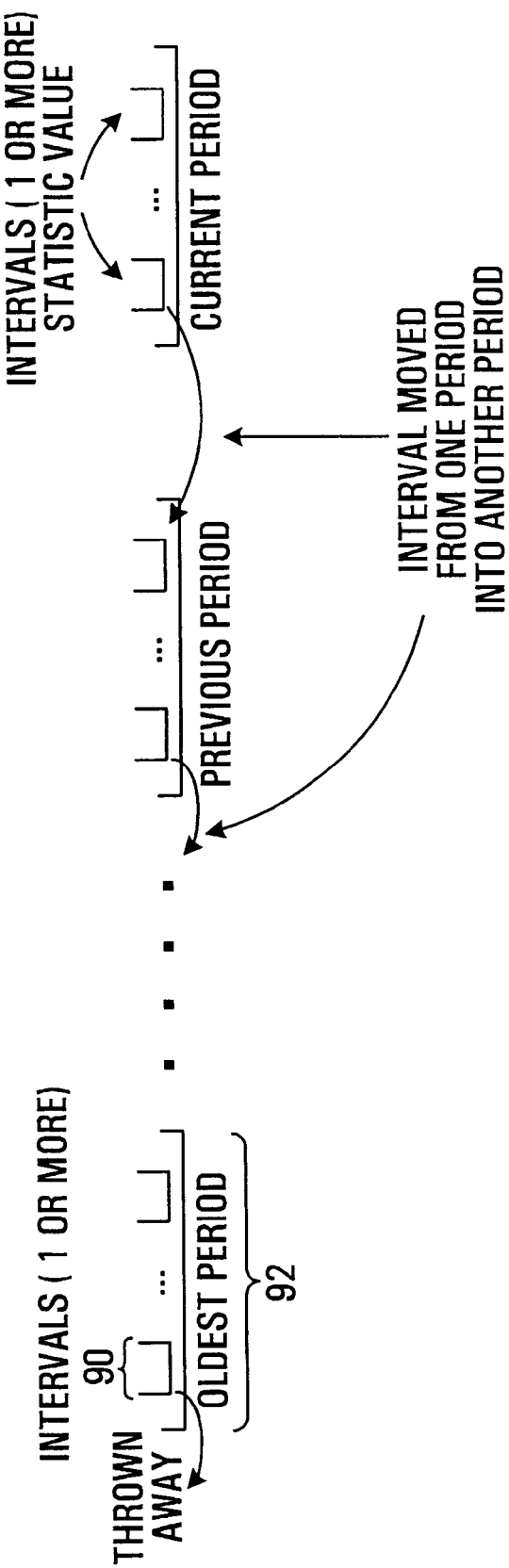
FIG. 4 illustrates the process of constructing a sliding window.

Optionally, a user may also ask for a sliding time window in respect of a summary statistic (S126). A sliding time window is a bar chart or graph with data items comprising a cumulative statistic, or an averaged instantaneous statistic, over each of a pre-defined number of consecutive time periods (this pre-defined number of time periods constituting the window). It is constructed by accessing historical as well as current statistics from memory 50. When a period elapses, the data item for the oldest time period of the window is dropped and a data item representing the statistic for the new time period is added. It is in this sense hat the time window is "sliding". Alternatively, if a more accurate sliding window is desired, then with reference to FIG. 4, with each new time interval 90 (which, it will be recalled, is set by the call center and may be shorter than the user defined period 92), the data items in the time window are adjusted as follows. In the case of a cumulative statistic, the value of the data item associated with the current time period is increased by the value of the cumulative statistic associated with the current interval and is decreased by the value of the cumulative statistic associated with the oldest time interval forming part of this data item. The value of this cumulative statistic associated with the oldest time interval of the data item representing the current time period is then added to the data item representing the next to current time period. The value of the cumulative statistic associated with the oldest time interval forming part of the next to current time period data item is removed from this data item. This process is repeated for each of consecutively older data items such that each data item has the value of one cumulative statistic for a time interval added to it aid one removed from it. In the case of an instantaneous statistic, the process is the same but with the average over a period being calculated after the one new interval value has been added and the oldest interval value has been dropped. FIG. 4 illustrates this sliding window process.

Figure 5:
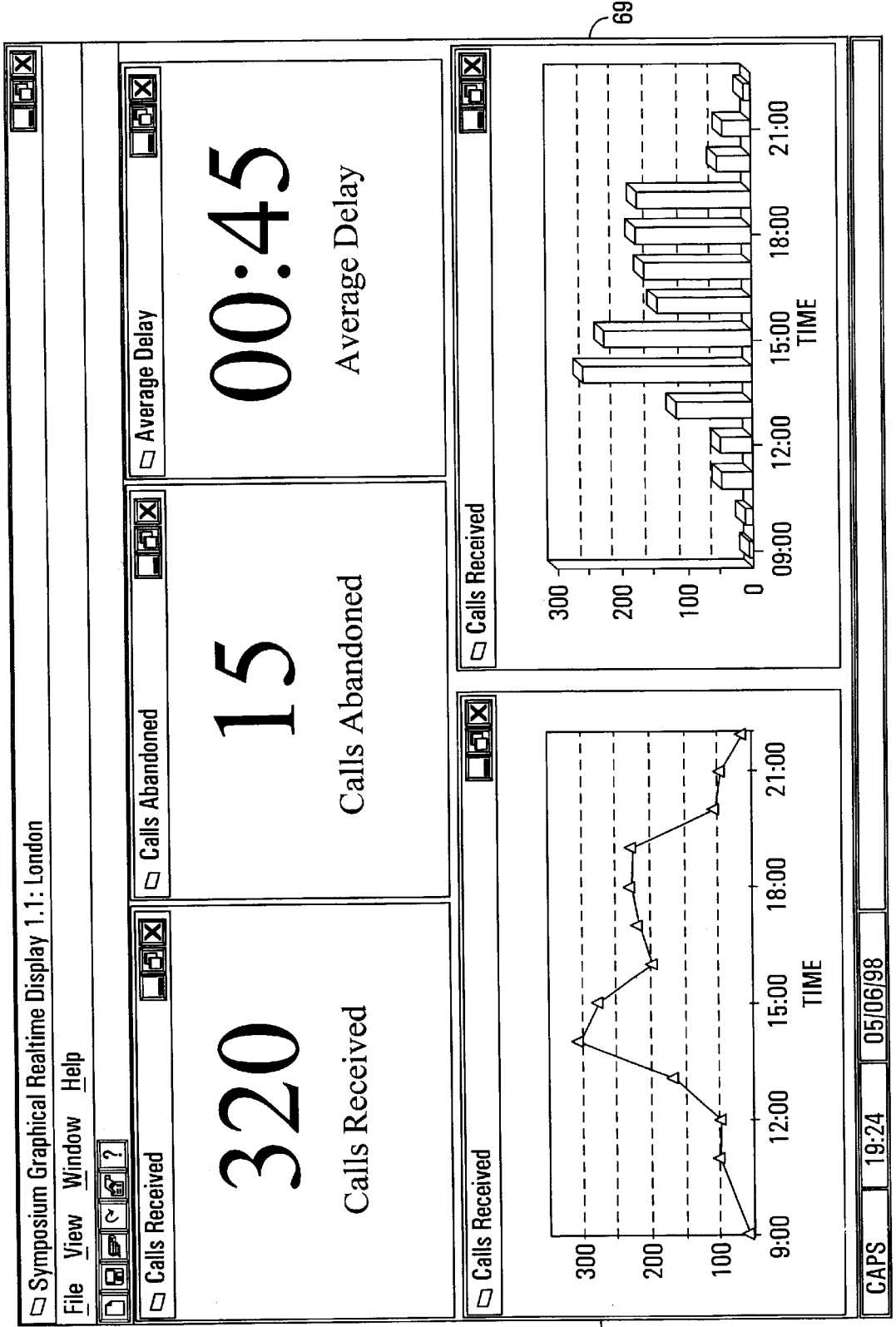
FIGS. 5 to 10 are sample displays for the PC of FIG. 2.

The user may select the size, position, and color of the window (S127). Additionally, the user may open other windows for any of the other summary statistics and configure the windows on the display as desired (S125, S126). A sample screen generated by the management summary sub-routine is illustrated in FIG. 5. In respect of the sliding windows illustrated at 70 and 72, it is noted in the case of the bar chart 72, each bar represents one data item for one time period and in be case of the graph 70, each point on the graph represents one data item for one time period.

If the value of any instantaneous statistic exceeds a user defined threshold or the value of a statistic accumulated over a time period exceeds a user defined threshold, then the window containing the data item representing this statistic is expanded—when it is not already expanded—and placed in the foreground—when it is not already in the foreground (S128). In addition, the color of the window may default to an urgency indicating color, the window may flash, or the PC may generate a warning sound (S129). Optionally, the user may set escalating thresholds with a greater number of attention demanding events occurring with each higher threshold reached. It will be understood that some thresholds (such as service level) will he defined as being exiled by dropping below an acceptable level and others (such as calls waiting) will be defined as being exceeded by increasing above an acceptable level.

Access to the management summary sub-routine may be password controlled.

Figure 3C:
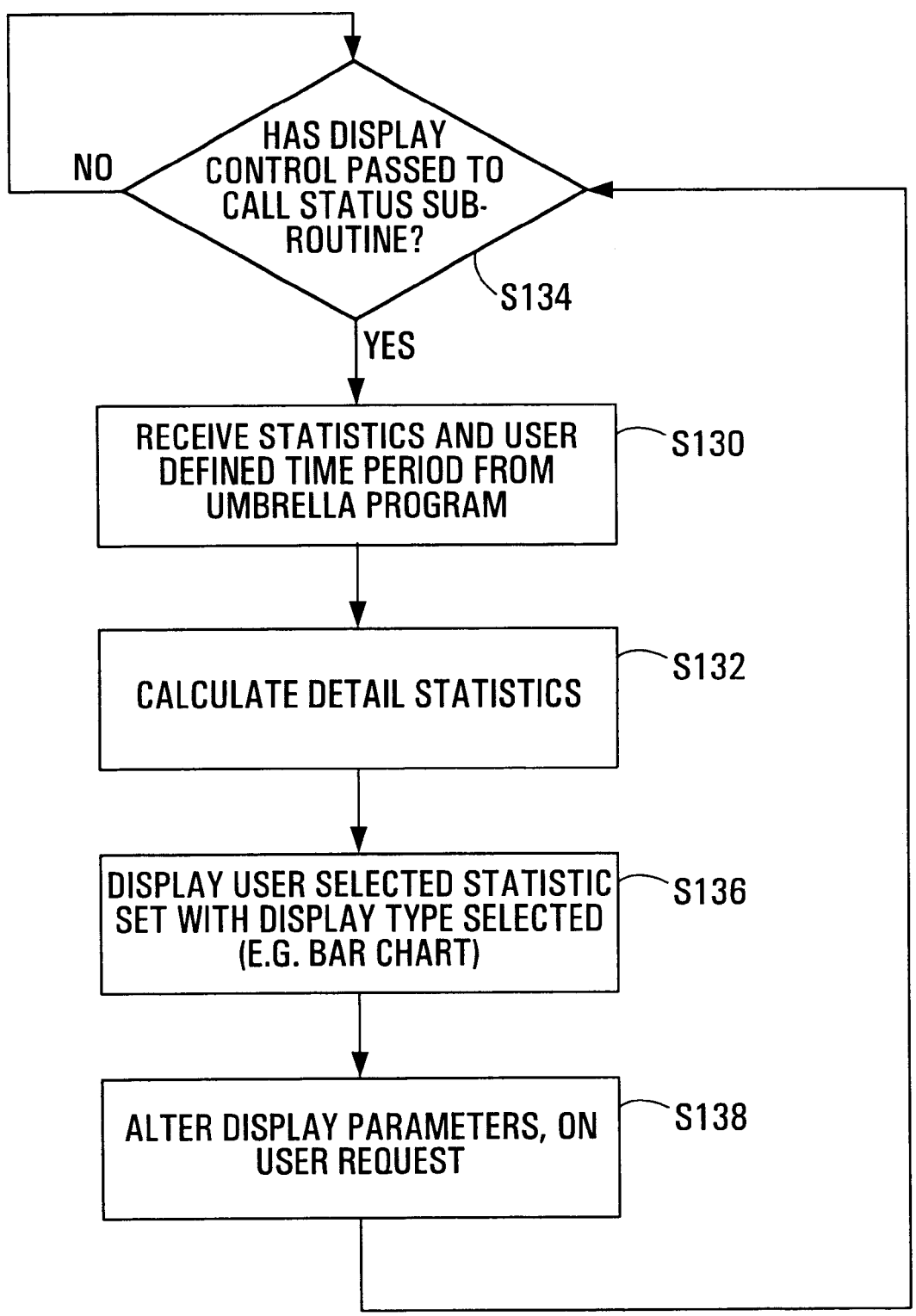

Referencing FIG. 3c which illustrates program control for the call status sub-routine, this routine obtains statistics and the user defined time period via the umbrella program (S130) and calculates certain sets of detail statistics (S132). More particularly, the processor calculates instantaneous statistics for each skillset of each application, such as the following: (i) the tool number of calls currently waiting; (ii) the total number of agents on a skillset call. It may also calculate the total number of agents an outgoing call. As well, using the user defined time period, the processor calculates cumulative statistics for each skillset of each application such as the following: (i) tile number of calls answered during the period; (ii) the number of calls abandoned during the time period; (iii) the percentage of total calls waiting which were answered in the time period. If a user has requested the call status screen such that display control has passed to the call status sub-routine (S134), a user may ask to view any of the sets of detail statistics which results in a window being displayed on display 54 with the requested statistics set being displayed as a set of data items (S136). The user selects between a bar chart (with each bar comprising a data item), pie chart (with each pie slice comprising a data item), line graph, and sliding time window, and the user may also configure the window size, position, and the like as desired (S138). Additionally, the user may open windows for any of the other statistics sets and configure the windows on the display as desired (S136). Sample screens generated by the call status subroutine for skillsets grouped in the application "sales" are illustrated in FIGS. 6 and 7.

Figure 3D:
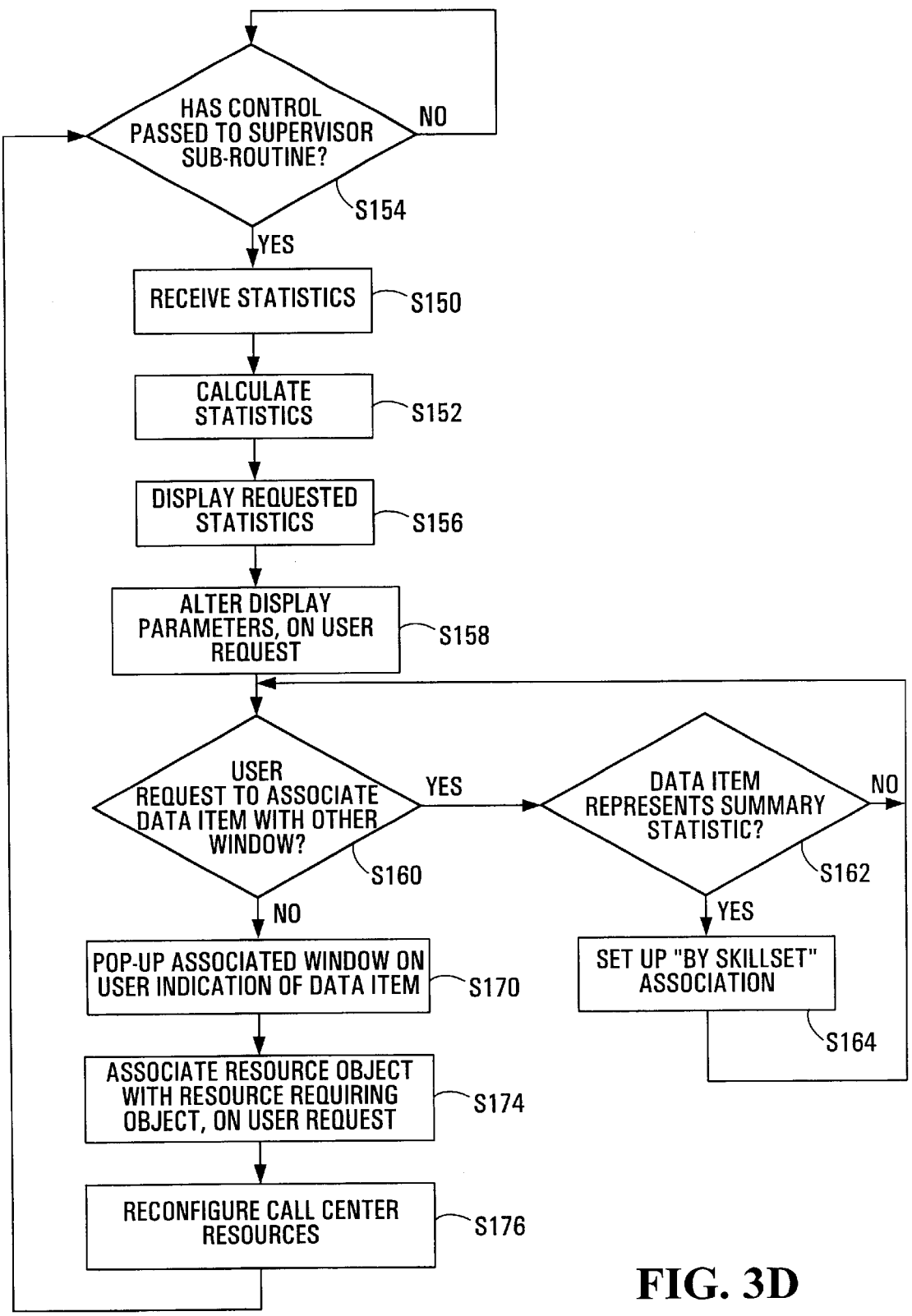
Figure 8:
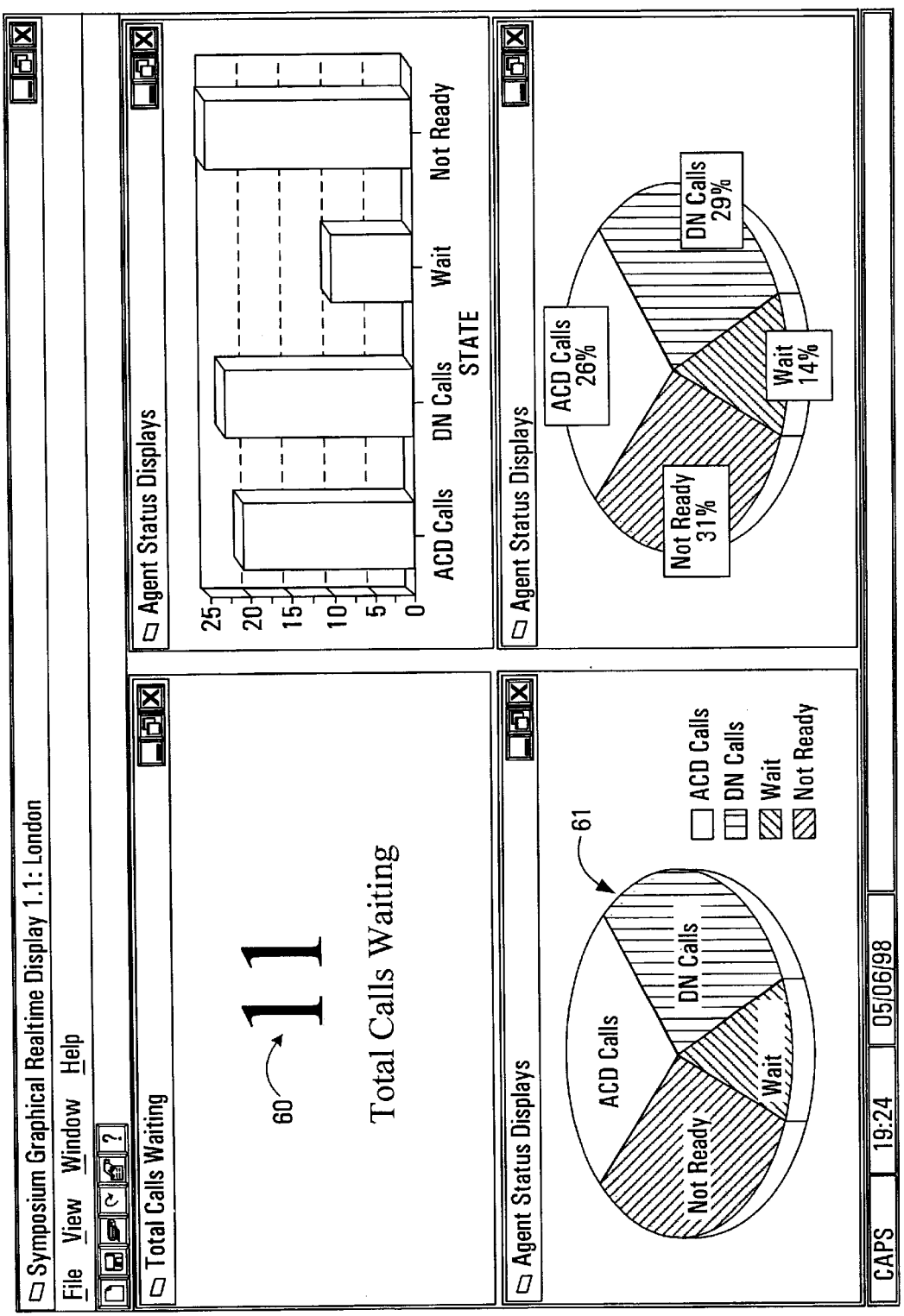
Figure 9:
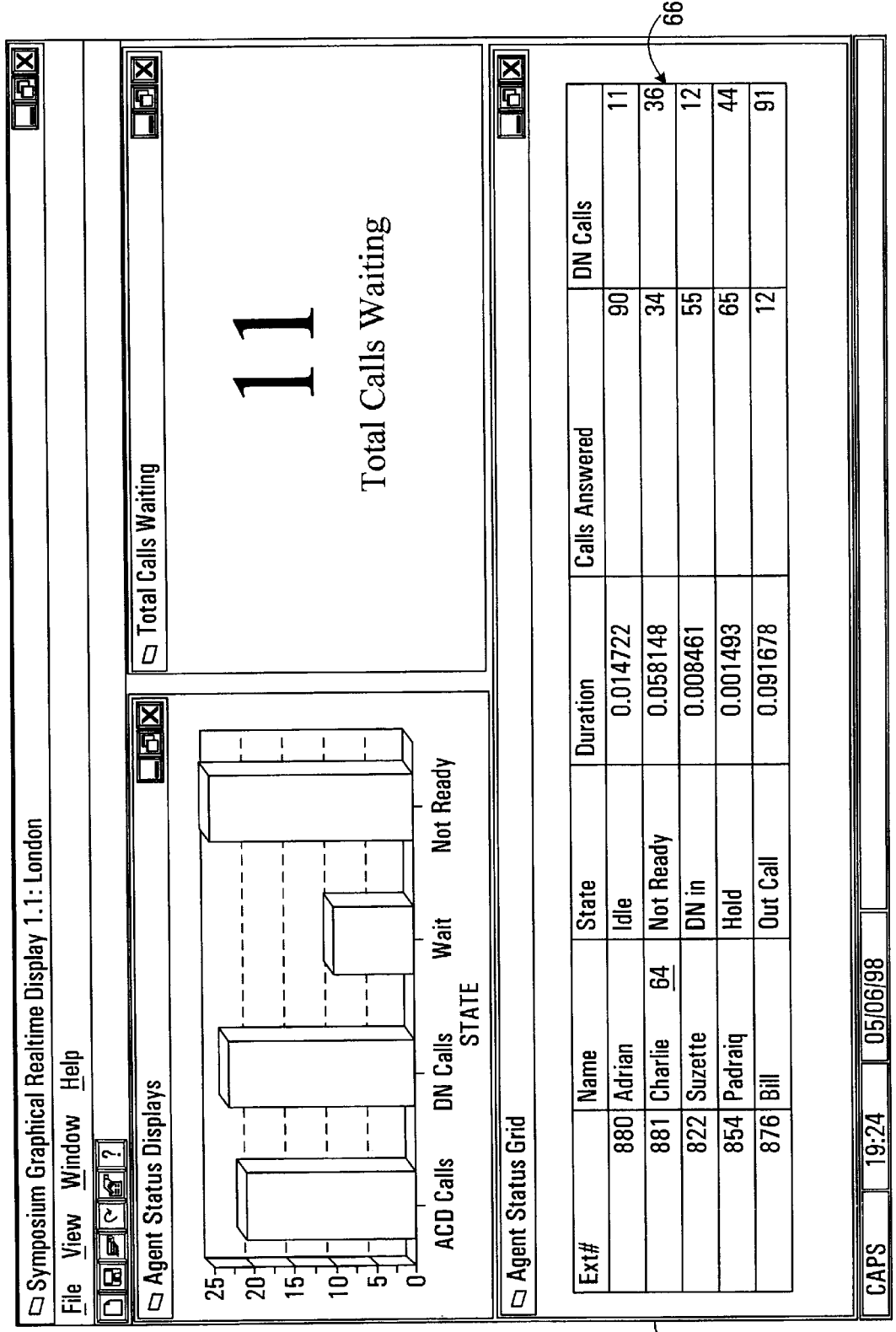

A supervisor sub-routine, illustrated in FIG. 3d, is also defined. This sub-routine may provide the ability to see user selected statistic available by way of the management sub-routine and by way of the call status sub-routine. In addition, the supervisor sub-routine may provide for an identification of agents and detailed sets of agent status statistics (S150, 152). FIG. 8 represents a sample supervisor screen with a billboard window for total calls waiting and bar and pie chart windows with data items, such as data item 61, representing a status statistic for agents (the label "DN calls" representing outgoing calls). FIG. 9 represents another sample supervisor screen with a window 62 displaying agent names as objects 64 as well as statistical data items 66 associated with each agent name object. If a user has requested the supervisor screen such that display control has passed to the supervisor sub-routine (S154), a user may ask to view any of the summary statistics or sets of detail statistics which are available by way of the supervisor sub-routine; this results in windows being displayed on display 54 with the requested statistics displayed as data items (S156). Again, the user may configure these windows (S158). Access to the supervisor sub-routine may be password controlled.

A user also has the option of associating any data item in any given window with another window, which other window may contain a single data item or a set of data items (S160). For example, a user may associate the total calls waiting data item 60 of FIG. 8 with the agent status window 62 of FIG. 9. In such instance, whenever a user thereafter indicates data item 60 (such as by pointing this data item with a mouse pointer and clicking the mouse), window 62 pops up (S170). In this way a user may, for example, configure associations so as to be able to obtain greater detail on a summary statistic simply by indicating the data item representing such statistic. The association may be two-way such that if a user indicates window 62, the window containing data item 60 pops up. When a user requests an association of a data item with a window and the data item represents a summary statistic (S162), then the sub-routine sets up a "by skillset" association between each skillset of detail statistics for this summary statistic with the other window (S164). Then, should a user thereafter indicate a data item representing a detail statistic for this summary statistic, the associated window pops up but with information only for the one skillset (S170). For example, where the user has associated total calls waiting data item 60 (FIG. 8) with agent status window 62 (FIG. 9), then the sub-routine will also associate each data item in the calls waiting by skillset window 70 (FIG. 6) with the agent status window 62 (FIG. 8) together with an indication that the association is "by skillset".

Figure 6:
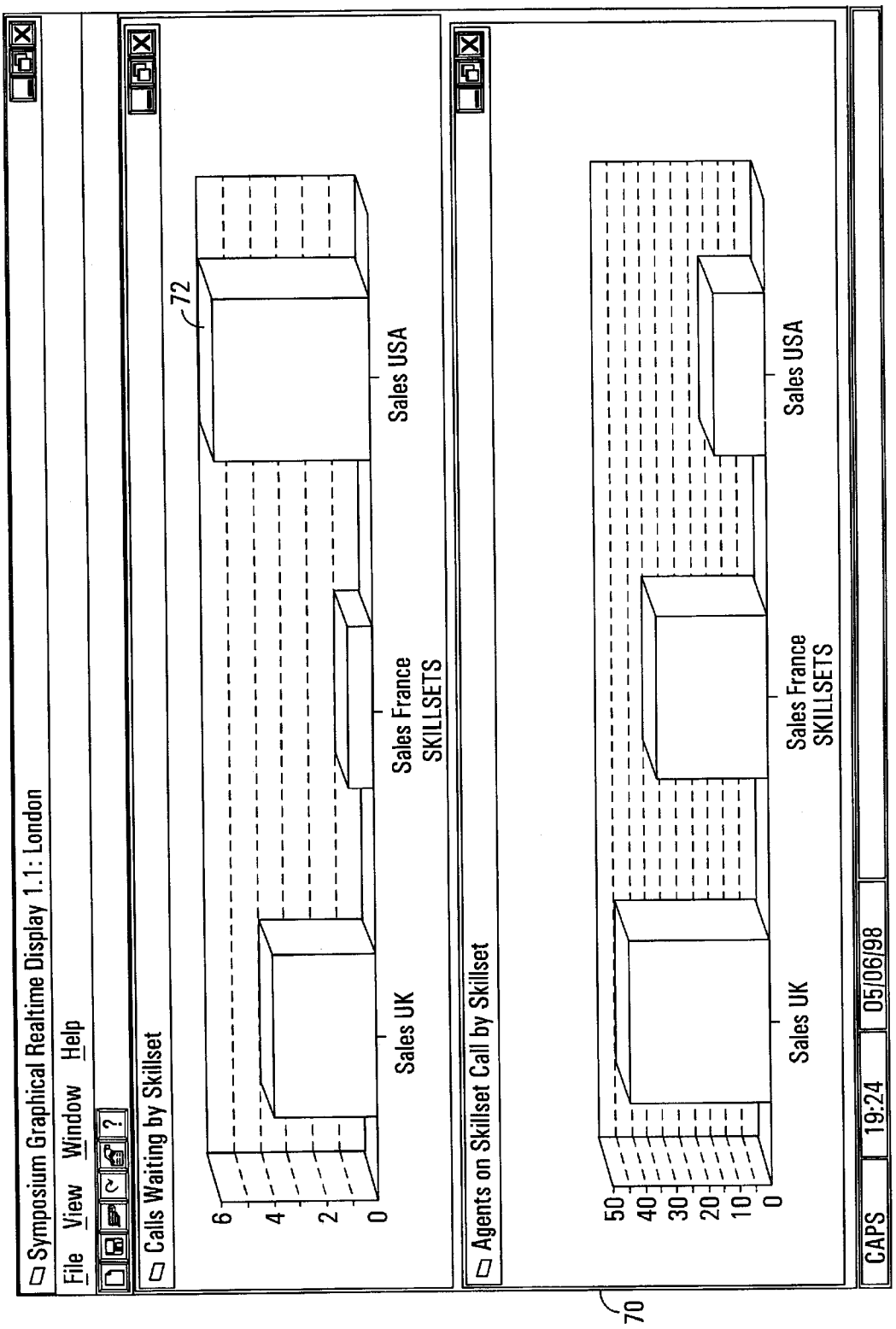
Figure 7:
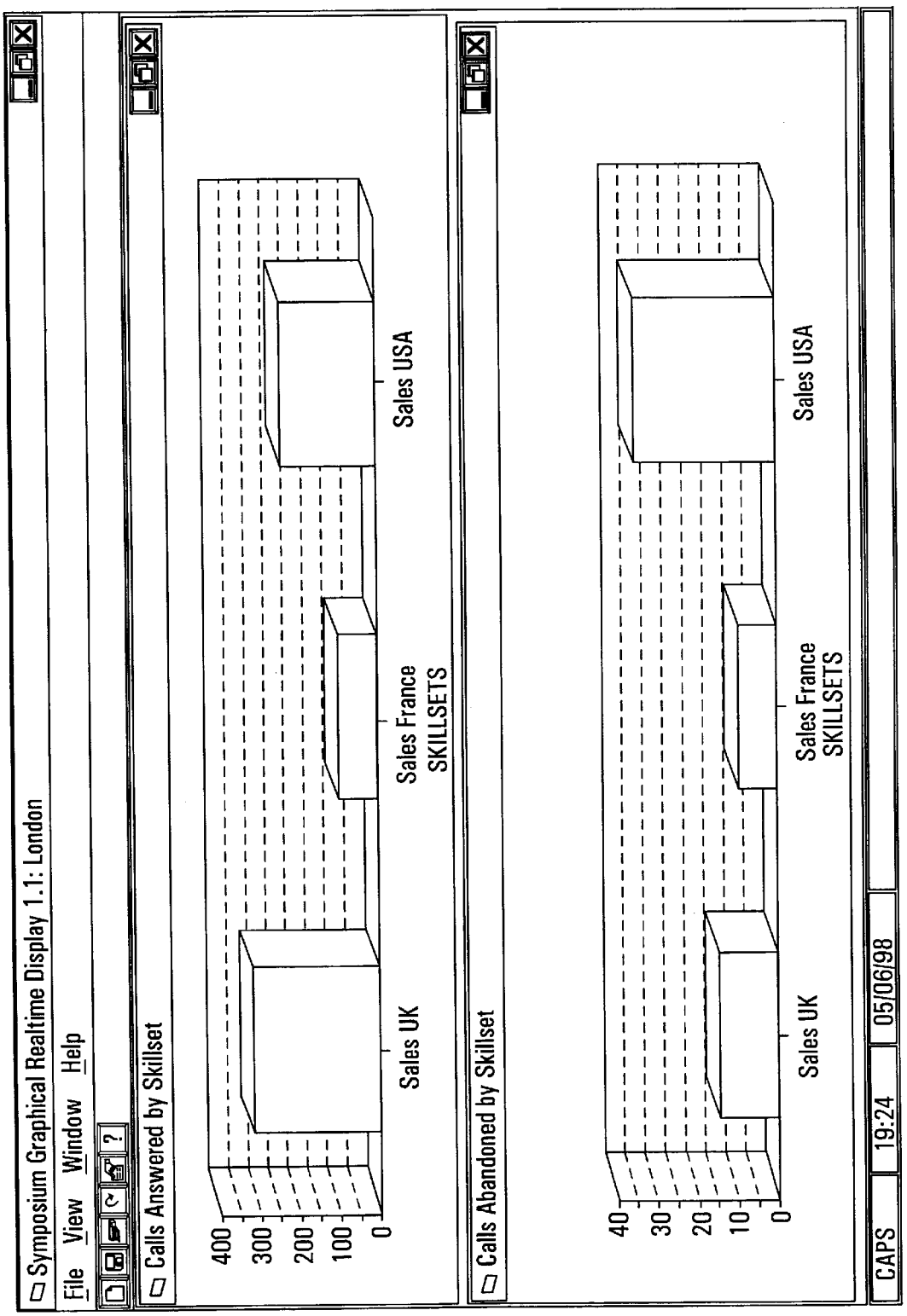

Consequently, should a user thereafter indicate, for example, data item 72 (FIG. 6) of window 70 (FIG. 6)

representing calls waiting for the region of the U.S.A., window 62 (FIG. 9) would pop up, but populated with statistics only for agents handling calls for the region of the U.S.A.

Optionally, a user association of a data item represent a skillset statistic with a window may trigger the sub-routine to set up a "by application" association. In this case each skillset in the application of which the skillset statistic represented by the indicated data item is a member is associated with the other window. In such instances by a user thereafter indicating any of the data items for the skillsets in this application, the other window will pop up, but populated with information only for the one application suggested by the data item.

Agents and phone lines are resources of a call center. Waiting calls are resource requiring processes. The supervisor sub-routine allows a user to associate any resource object with any resource requiring object. This may be accomplished by the user pointing to a displayed resource object and dragging it into the data item of a resource requiring object (S174). The result is a message from the PC to the call center asking for a reconfiguration of the call center to allocate the selected resource to the selected resource requiring process (S176). For example, the user could point to the agent object "Charlie" illustrated at 64 on window 62 of FIG. 9, then open window 70 illustrated in FIG. 6 and drop the Charlie object on data item 72. This would result in the processor 40 sending a massage to the call center requesting Charlie be allocated to calls waiting from the region of the U.S.A. Similarly, the call center may provide information on phone lines used by the call center and phone lines which could be allocated to the center. These may be displayed as resource objects in a window of the supervisor screen such that an unallocated phone line could be dragged and dropped into a window indicating the level of utilisation of telephone trunks in order to reconfigure the call center to use this additional phone line.

Figure 10:
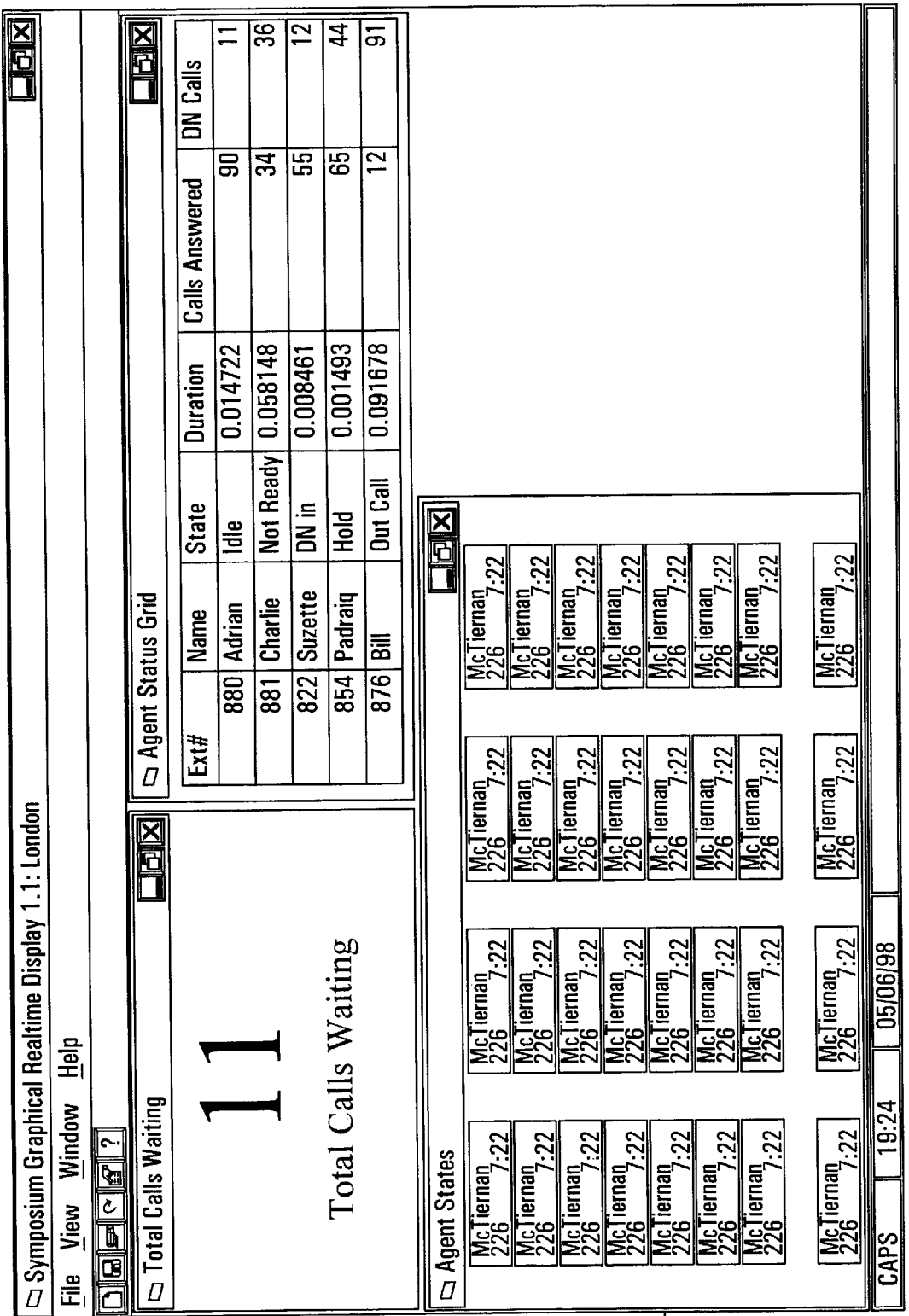

As illustrated in FIG. 10 at 80, a map of agents at the call center may also be displayed as objects on the supervisor screen updated periodically or when an agent logs on or off from the system. The supervisor may indicate one of the agent objects and be presented with a menu to change the state of the agent (e.g., for "not ready" to "ready"). The agent would then receive an indication of his change of state. This saves time as compared with calling an agent with a request for a status change. The supervisor may also select a "listen in" item from menu to listen to the current call of the agent.

Statistics of interest to all in the call center may be displayed in billboard fashion on the flat panel monitor 28, which monitor may be of sufficient size for all to see. Thus, the flat panel monitor may take the place of a wallboard and has the advantage that all statistics are displayed at a static spot on the screen as compared with the scrolling display of a wallboard. The flat panel monitor has greater information relaying capabilities as compared with a wallboard due to its ability to show statistics in colour (that can be changed at threshold levels) and to provide various representations (such as bar and pie charts or even video). The flat panel monitor also allows a person to more easily modify the displayed contents than does a wallboard. As an alternative to a flat panel monitor, a large size plasma display may be used The WAN router 30 may be used to link to other call centers so that it is possible for the PCs to access statistics for a group of call centers rather than a single call center. This feature can be used to co-ordinate the control of a group of call centers.

While the call center server of FIG. 1 has been illustrated as a distinct element, in some call centers the server is part of the telephone switch.

While the teaching of the subject invention are particularly advantageous in facilitating management of a call center, they may have application to the management of other systems, such as a stock brokerage.

Other modifications will he apparent to those skilled in the art and, therefore, the invention is defined in the claims.

What is claimed is:

1. A method of facilitating management of call center resources, comprising:

repeatedly receiving updates respecting at least one set of at least one call center statistic and, for each of said at least one set of at least one call center statistic, displaying a window containing a set of corresponding data items based on said updates;

where an update in respect of a statistic of a set of at least one call center statistic exceeds a threshold, expanding a corresponding window for a corresponding, set of data items, if said position, if said corresponding window is not displayed in a foreground position.

2. The method of claim 1 further comprising:

repeatedly receiving updates respecting at least one set of resources and, for each of said at least one set of resources, displaying a window containing a set of corresponding resource objects based on said updates; and repeatedly receiving updates respecting at least one set of resource requiring processes and, for each of said at least one set of resource requiring processes, displaying a window containing a set of corresponding resource requiring objects based on said updates.

3. The method of claim 2 further comprising:

receiving a user input indicating an action in respect of one said window;

undertaking said action in respect of said one said window, wherein said action in respect of said window comprises one of (i) resizing said window; (ii) minimizing said window; (iii) moving said window to a foreground position; (iv) moving said window to a background position; and (v) repositioning said window.

4. The method of claim 1 wherein a set of at least one statistic comprises a target statistic and wherein the step of displaying comprising displaying a window of data items representing said target statistic for each of a plurality of consecutive time periods.

5. The method of claim 4 wherein said target statistic comprises an instantaneous statistic and wherein said step of displaying includes obtaining an average value of said instantaneous statistic for each of said plurality of consecutive time periods.

6. The method of claim 4 further comprising:

constructing a new data item based on received updates;

displaying said new data item as part of said window;

ceasing to display a data item represented by an oldest time period when said new data item is displayed.

7. The method of claim 6 wherein each data item is constructed from a collection of consecutive updates and further comprising:

with each update received, adding said received update to a data item associated with a most recent time period and removing an oldest update from said data item associated with said most recent time period;

for each remaining data item of said window, removing an oldest update and adding an oldest update from a data item for a next consecutive more recent time period.

8. A computer readable medium containing computer readable instructions which, when executed in a processor of a supervisor computer of a call center system, adapt said processor to:

repeatedly receive updates respecting at least one set of at least one call center statistic and, for each of said at least one set of at least one call center statistic, display a window containing a set of corresponding data items based on said updates;

where an update in respect of a statistic of a set of at least one call center statistic exceeds a threshold, expand a corresponding window for a corresponding set of data items, if said corresponding window is not expanded and display said corresponding window in a foreground position, if said corresponding window is not displayed in a foreground position.

9. A system for facilitating management of call center resources, comprising:

means for repeatedly receiving updates respecting at least one set of at least one call center statistic and, for each of said at least one set of at least one call center statistic, displaying a window containing a set of corresponding data items based on said updates;

means for, where an update in respect of a statistic of a set of at least one call center statistic exceeds a threshold, expanding a corresponding window for a corresponding set of data items, if said corresponding window is not expanded and displaying said corresponding window in a foreground position, if said corresponding window is not displayed in a foreground position.

\* \* \* \* \*

UNITED STATES PATENT AND TRADEMARK OFFICE
CERTIFICATE OF CORRECTION

PATENT NO.    : 6,526,397 B2                                              Page 1 of 1
DATED         : February 25, 2003
INVENTOR(S)   : Chaun K. Chee et al.

It is certified that error appears in the above-identified patent and that said Letters Patent is hereby corrected as shown below:

Column 5,
Line 31, replace "70 and 72" with -- 67 and 69 --;
Line 32, replace "72" with -- 69 --;
Line 33, replace "70" with -- 67 --;

Column 8,
Line 21, replace "if said position, if said corresponding window is not displayed in a foreground position" with -- if said corresponding window is not expanded and displaying said corresponding window in a foreground position, if said corresponding window is not displayed in a foreground position. --

Signed and Sealed this

Seventeenth Day of February, 2004

JON W. DUDAS
*Acting Director of the United States Patent and Trademark Office*